United States Patent Office

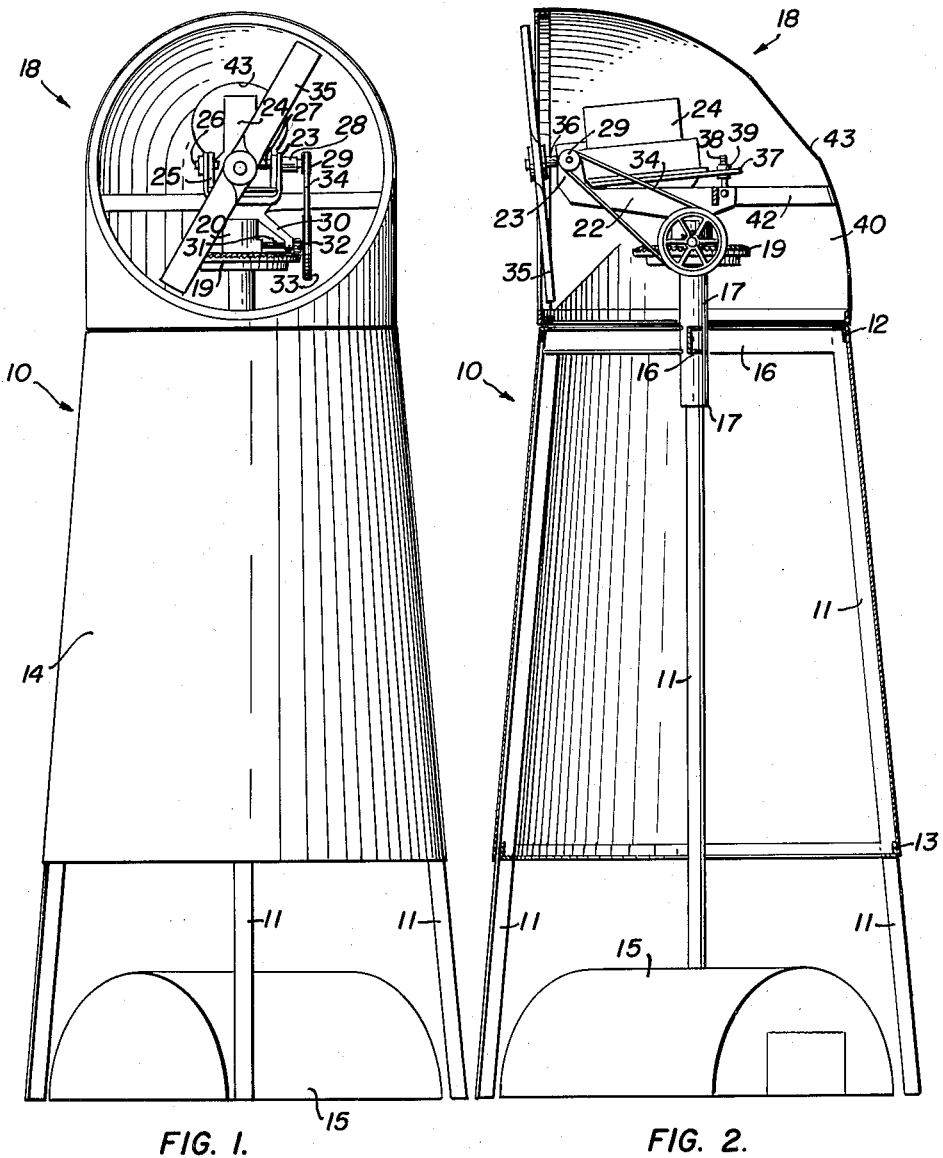

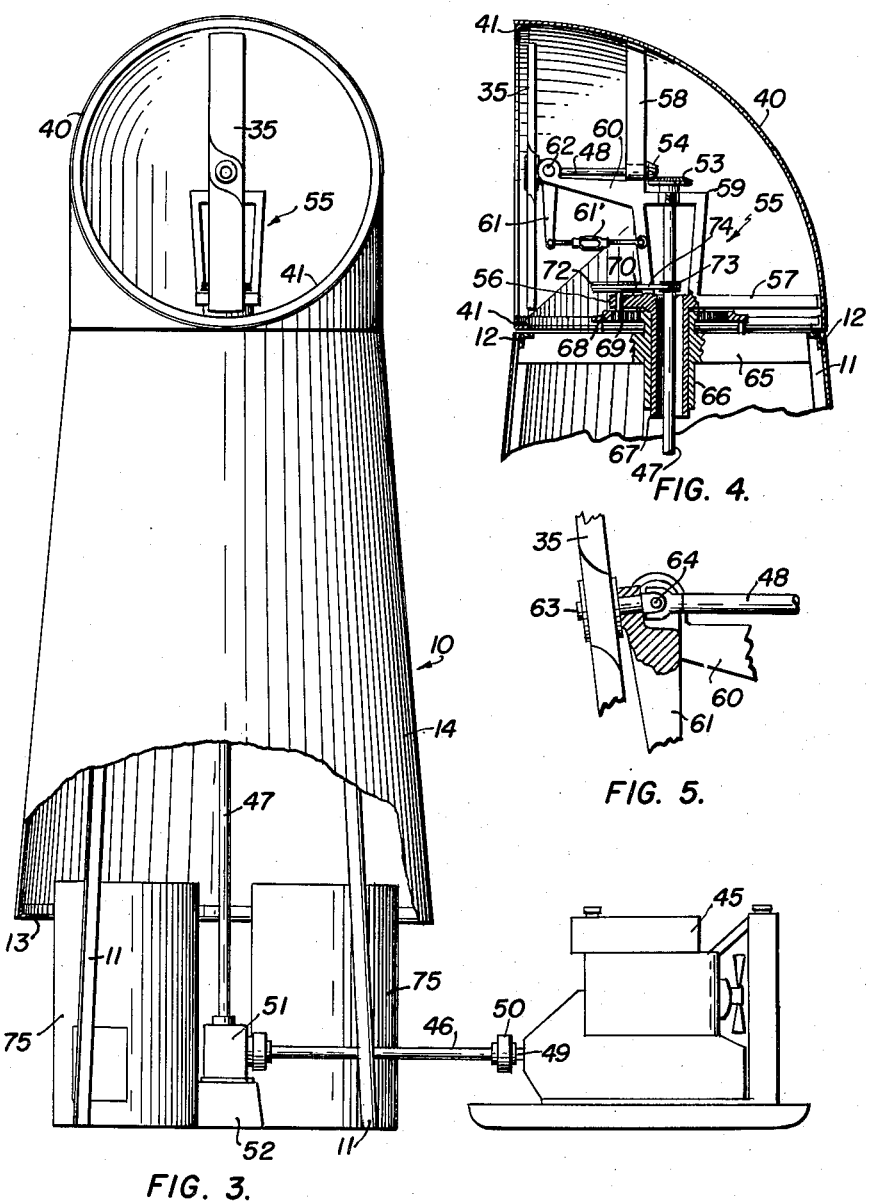

2,966,763
Patented Jan. 3, 1961

2,966,763

AGRICULTURAL HEATER TO PROTECT CROPS FROM FROST

Tom F. Ferrell, Rte. 1, Box 188, Maitland, Fla.

Filed July 31, 1959, Ser. No. 830,925

6 Claims. (Cl. 47—2)

This invention relates to heaters for protecting crops from frost and freezing and has reference to apparatus for distributing warm air in fields, orchards or the like. Generally, the invention is directed to a tower having a rotating blower on the top thereof, and means supplying heated air to the blower.

An object of the invention is to provide an agricultural heater capable of recirculating heated air for effecting fuel economy.

Another object is to provide a heater capable of applying warm air over a large area of an orchard, field or the like, for protecting fruits, vegetables from frost or cold air.

Another object is to provide an agricultural heater capable of being adjusted to direct warm air to desired circular areas of a field or orchard.

A further object is to provide a heater of the described class capable of operation for long periods of time without attention or servicing.

A still further object is to provide an agricultural device capable of heating an orchard or field by both radiation and convection of heat.

These and other objects will become apparent from the following description and accompanying drawings, wherein:

Figure 1 is a front elevational view of an agricultural heater embodying the features of the invention.

Figure 2 is a vertical sectional and partly elevational view taken at a right angle with reference to Figure 1

Figure 3 is a front elevational view of a modified form of the invention.

Figure 4 is a broken vertical sectional and partly elevational view taken at a right angle with reference to the upper portion of Figure 3, and Figure 5 is a broken side elevational and fragmentary sectional view of means adjustably mounting the impeller of the last referred to form of the invention.

Referring now to Figures 1 and 2, the form of the invention shown includes a tower 10 comprised of generally vertical legs 11, upper and lower circular formers 12 and 13 secured to the legs, and a sheet metal case 14 therearound. The lower former 13 and lower edge of the case 14 are spaced from the ground so as to provide a primary air source and also means for recirculating air as hereinafter referred to in the description of operation. A heater 15 of any suitable construction is placed on the ground between the legs 11 for heating air drawn upwardly through tower 10.

Radial arms 16 are mounted in the upper end of tower 10 for supporting a vertical bearing 17 which, in turn, rotatably supports a blower assembly 18. The outer ends of the radial arms 16 are directly attached to the upper ends of the tower legs 11, whereas the inner ends are secured, as by welding, to the vertical bearing 17 which extends upwardly a short distance thereabove and where a large ring gear 19 is fixedly mounted. A shaft, not shown, extends downwardly into the vertical bearing 17, and which shaft is provided at its upper end with a collar 20 which serves as a thrust bearing in turning contact with the ring gear 19 and a support for the entire blower assembly 18.

Rigidly mounted on the collar 20 there is a horizontal frame 22 having upstanding parallel arms 23 at one end thereof for pivotally supporting the forward end of an internal combustion engine 24. A U-shaped cradle 25 supports the engine 24 by a pin 26 at one side and by a lateral power take-off shaft 27 on the other side. The shaft 27 is driven by the engine 24. A bearing 28 on the outer surface of one arm 23 supports the shaft 27, and on the outer end of the shaft there is a drive pulley 29. Integral with the horizontal frame 22 and beneath the shaft 27 there is an angularly depending arm 30 which rotatably supports another or driven shaft 31, which shaft has a pinion gear 32 thereon meshing with the ring gear 19, and which shaft has a driven pulley 33 on its outer end for connection with the drive pulley 29 by means of an endless belt 34.

An impeller 35 is mounted on the crankshaft 36 of the engine 24, and the axis of the impeller is horizontally adjustable by means of a plate 37 extending rearwardly from the engine and connected with the frame 22 by means of an L-shaped bolt 38. The head of the bolt 38 pivotally engages the frame 22 whereas the shank of the bolt extends through the plate. Nuts 39 on opposite sides of the plate provide for the adjustment.

An L shaped sheet metal hood 40 is mounted atop the tower 10 and encloses engine 24. The ends of the hood 40 are open and round where they are reinforced by circular formers 41, one of the ends being coincident with the upper end of the case 14 and the other end being around the impeller 35. The hood 40 is supported on the frame 22 by radial brackets 42. A secondary air inlet in the hood 40 is provided by means of a circular opening 43 therein opposite the opening in which the propeller 35 is mounted.

The form of the invention illustrated in Figures 3–5 includes the previously described tower 10, legs 11, upper and lower circular formers 12 and 13, sheet metal case 14 therearound, L-shaped hood 40, circular formers 41 in the open ends thereof and impeller 35 in the discharge open end of the hood. The primary difference between the second form of the invention and the first described is that the engine 45 is on the ground and outwardly of the tower and transmits power to the impeller 35 through a lower horizontal shaft 46, a vertical shaft 47 and through an upper horizontal shaft 48 connected with the impeller. The lower horizontal shaft 46 is connected to the drive 49 of the engine 45 by means of a coupling 50, and the lower end of the vertical shaft 47 is connected to the lower horizontal shaft 46 by means of a gear box 51 mounted on a base 52. The upper end of the vertical shaft has a bevel gear 53 which meshes with a smaller bevel gear 54 on the inner end of the upper horizontal shaft 48. Within the hood 40 there is a frame 55 which includes a horizontal base 56, radial arms 57, the outer ends of which are connected with the inner surface of the hood, a vertical support 58 also connected with the inner surface of the hood, a horizontal support 59 on which the first referred to bevel gear 53 turns and parallel outwardly projecting arms 60. It is to be noted that the inner end of the upper horizontal shaft 48 is journaled in the vertical support 58.

The parallel forwardly projecting arms 60 pivotally support a depending control arm 61 by means of aligned separate pins 62 in the upper end thereof. A shaft 63 on which the propeller 35 is mounted extends through and is journaled in the upper end of the control arm 61 where the shaft is connected with the upper horizontal shaft 48 by a universal coupling 64. The lower end of the control arm 61 is connected with the frame 55 by means of a turn buckle assembly 61'.

Referring now to Figure 4, a spider 65 is connected with the upper ends of the legs 11, and the center of which spider includes a vertical tubular bearing 66 in which there is a rotatably mounted tubular shaft 67 integral with and depending from the horizontal support 56 of the frame 55. An internal ring gear 68 is mounted on the spider 65 and is arranged for coaction with a pinion gear 69 on the lower end of a vertical shaft 70 which extends through the horizontal support 56 forming a part of the frame 55. The upper end of the shaft 70 has a driven pulley 72 connected with a drive pulley 73 on the vertical shaft 47 by an endless belt 74. Heaters 75 are placed on the ground between the lower ends of the legs 11.

In both described forms of the invention the operation is substantially the same. Heat is drawn upwardly through the case 14, is then directed laterally by the L shaped hood 40 and discharged by the impeller 35. The impeller 35 in either form of the invention may be adjusted to blow horizontally or downwardly by reason of the described adjustments at 38 or 61' in which case a portion of the air is recirculated. The heaters 15 or 75 not only heat air passing upwardly through the case 14 and hood 40, but additionally provide some radiant heat.

The invention is not limited to the exemplary construction herein shown and described, but may be made in many ways within the scope of the appended claims.

What is claimed is:

1. An agricultural heater comprising a tower including a case therearound, means admitting air to the lower portion of said tower, a heater within said tower, a blower assembly above said tower, said blower assembly including an L shaped hood communicating with the top of the tower and having an air discharge opening in a side thereof, said air discharge opening in said L shaped hood being substantially equal in area to the upper end of said tower, means rotating said hood about a vertical axis, and draft means conveying air through said case and said hood.

2. An agricultural heater as defined in claim 1, and wherein said draft means conveying air through said case and said hood is comprised of a driven impeller in the path of the airflow.

3. An agricultural heater as defined in claim 1 and wherein said means rotating said hood includes a vertical tubular bearing in the upper end of said tower and a vertical shaft in said bearing, the upper end of said shaft having means supporting said hood.

4. An agricultural heater as defined in claim 1, and wherein said means admitting air to the lower portion of said tower is comprised of spacing the lower edge of said case from the ground.

5. An agricultural heater as defined in claim 4 and wherein said heater in said tower is placed adjacent the ground.

6. An agrictultural heater as defined in claim 1, and wherein said draft means conveying air through said case and said hood is comprised of a driven impeller within said hood, the axis of said impeller being within the axis of flow of air through said hood and the effective area of said impeller being substantially equal to the discharge opening of said hood.

References Cited in the file of this patent

UNITED STATES PATENTS

| 1,317,959 | Cobb | Oct. 7, 1919 |
| 1,372,793 | Andersson | Mar. 29, 1921 |
| 2,655,764 | Watkins | Oct. 20, 1953 |

FOREIGN PATENTS

| 1,012,109 | Germany | July 11, 1957 |